(12) United States Patent
Clark

(10) Patent No.: US 9,331,459 B2
(45) Date of Patent: May 3, 2016

(54) GENERATOR COUPLING KIT AND METHODS THEREOF

(71) Applicant: Michael Clark, Freehold, NJ (US)

(72) Inventor: Michael Clark, Freehold, NJ (US)

(*) Notice: Subject to any disclaimer, the term of this patent is extended or adjusted under 35 U.S.C. 154(b) by 18 days.

(21) Appl. No.: 14/079,636

(22) Filed: Nov. 13, 2013

(65) Prior Publication Data

US 2014/0132417 A1    May 15, 2014

Related U.S. Application Data

(60) Provisional application No. 61/725,944, filed on Nov. 13, 2012.

(51) Int. Cl.
| | |
|---|---|
| *G08B 21/00* | (2006.01) |
| *H02B 1/00* | (2006.01) |
| *H02G 3/00* | (2006.01) |
| *H02J 9/00* | (2006.01) |
| *H01H 9/28* | (2006.01) |
| *H01H 71/10* | (2006.01) |

(52) U.S. Cl.
CPC .. *H02B 1/00* (2013.01); *H02G 3/00* (2013.01); *H02J 9/00* (2013.01); *H01H 9/281* (2013.01); *H01H 71/1054* (2013.01); *Y10T 307/74* (2015.04)

(58) Field of Classification Search
CPC ............... H02B 1/00; H02G 3/00; H02J 9/00
USPC ........................................... 340/654; 307/112
See application file for complete search history.

(56) References Cited

U.S. PATENT DOCUMENTS

| | | | | |
|---|---|---|---|---|
| 4,698,621 | A  * | 10/1987 | Masot ........................... | 340/639 |
| 5,268,850 | A  * | 12/1993 | Skoglund ...................... | 700/297 |
| 6,424,060 | B1 * | 7/2002  | Shiely et al. .................. | 307/328 |
| 6,531,790 | B2 * | 3/2003  | Panuce et al. ................. | 307/64 |
| 6,624,534 | B1 * | 9/2003  | Flegel ........................... | 307/64 |
| 6,798,187 | B1 * | 9/2004  | Czarnecki .................. | 324/103 P |
| 7,800,512 | B1 * | 9/2010  | Czarnecki ................. | 340/693.1 |
| 7,843,358 | B2 * | 11/2010 | Sebescak ...................... | 340/660 |
| 8,004,115 | B2 * | 8/2011  | Chapel et al. ................. | 307/64 |
| 8,591,065 | B2 * | 11/2013 | Baer et al. .................... | 362/253 |
| 8,810,081 | B1 * | 8/2014  | Flegel et al. ................. | 307/328 |
| 9,007,745 | B1 * | 4/2015  | Flegel ........................... | 361/641 |

* cited by examiner

*Primary Examiner* — Eric Blount
(74) *Attorney, Agent, or Firm* — Michael P. Kochka, Esq.

(57) ABSTRACT

A generator coupling kit is provided. In exemplary embodiments, the generator coupling kit may comprise a wire adapted to couple with a generator on a first end, the wire adapted to couple with an outdoor box on a second end; the outdoor box adapted to couple with the wire; an indoor electrical panel adapted to couple with the outdoor box via a generator breaker; and the generator breaker adapted to couple with indoor electrical panel, the generator breaker adapted to couple with the outdoor box via internal wiring, the generator breaker comprising a circuit breaker.

20 Claims, 9 Drawing Sheets

GENERATOR COUPLING KIT AND METHODS THEREOF

CROSS-REFERENCE TO RELATED APPLICATIONS

The present application claims priority to U.S. Provisional Patent Application Ser. No. 61/725,944 entitled "GENERATOR COUPLING KIT AND METHODS THEREOF," filed Nov. 13, 2012, the disclosure of which is incorporated herein by reference in its entirety.

BACKGROUND

1. Field of the Invention

Embodiments of the present invention generally relate to a generator coupling kit. More specifically, embodiments of the present invention relate to a generator coupling kit for coupling a generator to an electrical panel that may comprise a lockout box, a safety member, a breaker lock, and a voltage/amperage meter.

2. Description of Related Art

Power generators may be used to restore power to buildings and/or devices that have lost power. Typically, power is restored with a generator by running extension cords to the generator through open doors and/or windows and/or by using transfer switches. Running these extension cords through windows creates a security risk for the building, creates a tripping hazard, and increases the risk of electrical shock to those in the vicinity.

In addition, typical permanent-type generators require the use of a transfer switch which powers a home or building in zones. While a transfer switch may be sufficient when powering specific portions of a panel are known/needed, a transfer switch limits the ability for a homeowner to consistently run most if not all breakers on a panel at once with a generator.

Thus, there is a need for a generator coupling kit and methods thereof.

SUMMARY

Embodiments of the present invention generally relate to a generator coupling kit. In one embodiment, a generator coupling kit is provided that may comprise a wire adapted to couple with a generator on a first end, the wire adapted to couple with an outdoor box on a second end; the outdoor box adapted to couple with the wire; an indoor electrical panel adapted to couple with the outdoor box via a generator breaker; and the generator breaker adapted to couple with indoor electrical panel, the generator breaker adapted to couple with the outdoor box via internal wiring, the generator breaker comprising a circuit breaker.

In another embodiment of the present disclosure, a generator coupling kit is provided that may comprise a wire adapted to couple with a generator on a first end, the wire adapted to couple with an outdoor box on a second end; the outdoor box adapted to couple with the wire; an indoor electrical panel adapted to couple with the outdoor box via a generator breaker; the generator breaker adapted to couple with indoor electrical panel, the generator breaker adapted to couple with the outdoor box via internal wiring, the generator breaker comprising a circuit breaker; a power meter coupled with the indoor electrical panel, the power meter adapted to measure the amount of electric energy being consumed; and an alarm system coupled with the indoor electrical panel.

In yet another embodiment of the present disclosure, method of using a generator coupling kit is provided that may comprise providing a generator coupling kit comprising: a wire adapted to couple with a generator on a first end, the wire adapted to couple with an outdoor box on a second end; the outdoor box adapted to couple with the wire; an indoor electrical panel coupled with the outdoor box, the indoor electrical panel comprising a main breaker, a plurality of auxiliary breakers, and a generator breaker; an alarm system coupled with the indoor electrical panel; a lockout box locking a portion of the wire within the box; a safety member adapted to prevent the activation of the main breaker attached to the indoor electrical panel; and a breaker lock preventing the activation of the generator breaker when in a locked position; unlocking the lockout box and removing the portion of the wire within the box; turning off all auxiliary breakers and the main breaker; covering the main breaker with the safety member; unlocking the breaker lock, thereby allowing activation of the generator breaker; turning on the generator; connecting the wire to the generator and the outdoor box; and turning on the generator breaker and at least one of the plurality of auxiliary breakers.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

The headings used herein are for organizational purposes only and are not meant to be used to limit the scope of the description or the claims. As used throughout this application, the words may and "can" are used in a permissive sense (i.e., meaning having the potential to), rather than the mandatory sense (i.e., meaning must). Similarly, the words "include",

DETAILED DESCRIPTION

Embodiments of the present invention generally relate to a generator coupling kit. More specifically, embodiments of the present invention relate to a generator coupling kit for coupling a generator to an electrical panel that may comprise a wire, an outdoor box, a generator breaker, internal wiring, a voltage/amp meter, an alarm system, and/or the like.

In accordance with embodiments of the present invention, a generator coupling kit may be adapted to couple a generator with an electrical panel, thereby eliminating the need for running extension cords through open doors, windows, and/or the like, and for transfer switches. By coupling the generator with an electrical panel, the tripping hazard caused by running cords through open doors and/or windows, the security risk, and the risk of electrical shock, can be substantially reduced and/or eliminated. Embodiments of the present invention may be adapted to allow a homeowner, or the like, to consistently run most if not all breakers on an electrical panel at once with a generator.

Figure 1:
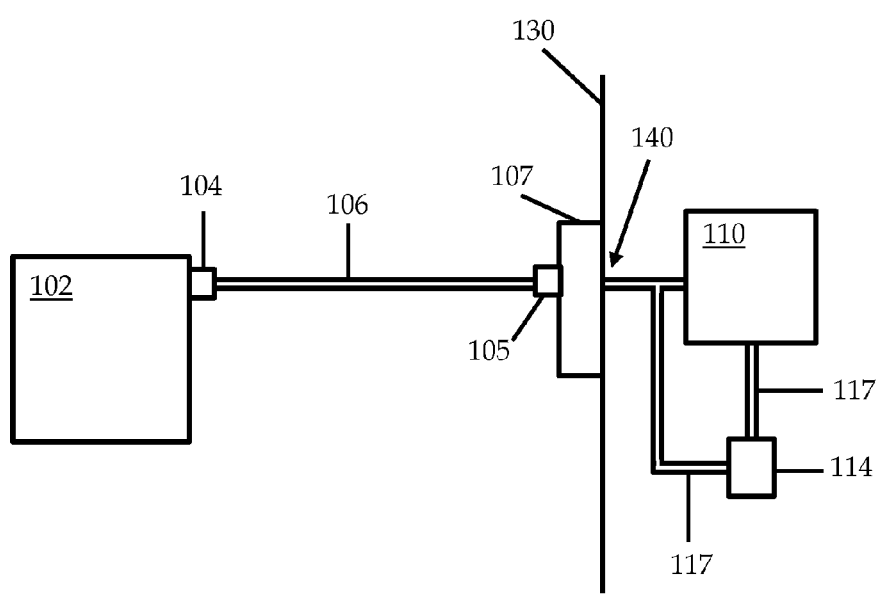
FIG. 1 depicts a block diagram of a portion of a generator coupling kit in accordance with embodiments of the present invention.

FIG. 1 depicts a block diagram of a portion of a generator coupling kit in accordance with embodiments of the present invention. In exemplary embodiments, a generator 102 may be coupled to an indoor electrical panel 110 and/or the like, via a generator coupling kit in accordance with embodiments of the present invention. A generator coupling kit may comprise a generator 102, a plug 104, a wire 106, an electrical panel connector 105, an outdoor box 107, a voltage/amp meter 114, internal wiring 117, an indoor electrical panel 110, a generator breaker (See FIG. 2), a safety member (See FIG. 2), a breaker lock (See FIG. 2), a lockout box (See FIG. 7B), an alarm system (See FIG. 4), and/or the like. In exemplary embodiments the generator coupling kit may be adapted to connect a generator 102 to an outdoor box 107 via a wire 106 and/or an outdoor box 107 to an indoor electrical panel 110 via internal wiring 117, and or/the like. In some embodiments, the generator coupling kit may be adapted to perform and/or assist in load balancing or load matching of electrical power and/or the like.

An outdoor box 107 may be connected to an indoor electrical panel 110 and/or a voltage/amp meter 114 via internal wiring 117 through a hole 140 in a wall 130, and/or the like. The wall 130 may be, for example, an exterior wall of a home or commercial building. The hole 140 may comprise an aperture, channel, conduit, and/or the like for allowing an electrical connection between an outdoor box 107 and an indoor electrical panel 110. In exemplary embodiments of the present invention, the wires, such as the wire 106, internal wiring 117, and/or the like may be passed through a conduit to create a more secure, stable, protected connection. In some embodiments, the hole 140 may be formed by drilling or otherwise creating an aperture in a structure, such as a wall, separating an indoor electrical panel 110 from an outdoor box 107 and/or the like. In some embodiments, multiple holes 140 in locations, sizes, and shapes adapted to allow a connection between the interior electrical panel 110 and the outdoor box 107 a may be used. In some embodiments, the holes 140 may be formed in the same shape and/or size as the internal wiring 117, the wire 106, and/or the like. In some embodiments, a closure member, such as a door, or the like may be placed on one or both sides of the hole 140 to enable a user to close the hole when the wires 106, 117 are removed and/or the like.

In some embodiments, an outdoor box 107 may be hard wired to an indoor electrical panel 110 and/or a voltage/amp meter 114 via internal wiring 117 and/or may be connected with wires having plugs and/or the like on one or more ends of internal wiring 117. Although the term "internal wiring" 117 is used, a portion of the internal wiring 117 may extend outside of a structure, such as a home or commercial building. For example, the internal wiring 117 may couple the generator 102 directly with an indoor electrical panel 110, and/or the like, such that a portion of the internal wiring 117 is outdoors and a portion of the internal wiring 117 is indoors. The generator coupling kit may be adapted to couple with any type of portable, semi-portable, or fixed generator. An exemplary generator is depicted in FIG. 6.

Figure 6:
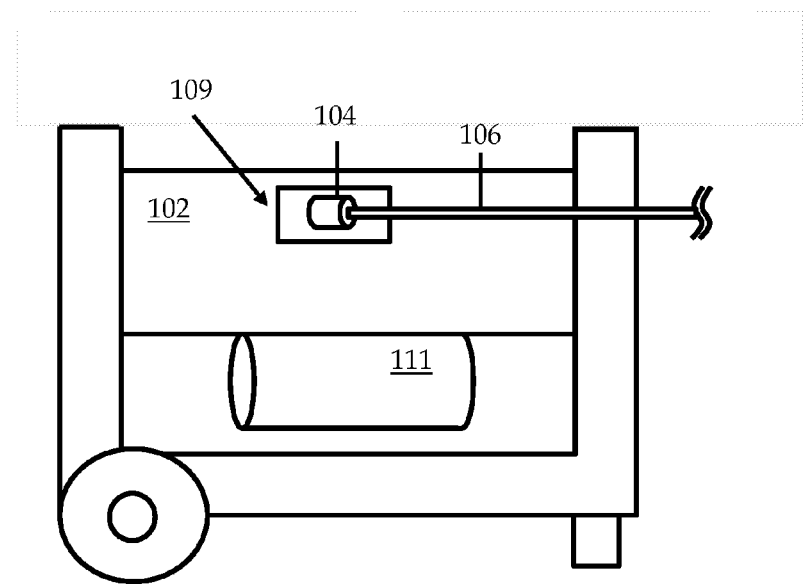
FIG. 6 depicts an exemplary generator for use with a generator coupling kit in accordance with embodiments of the present invention.

FIG. 6 depicts an exemplary generator 102 for use with a generator coupling kit in accordance with embodiments of the present invention. A generator 102 may comprise any type of generator consistent with the embodiments disclosed herein and any device that converts mechanical energy into electrical energy. For example, a generator 102 may comprise a gasoline generator, a diesel generator, a propane generator, a recreation generator, an emergency generator, a professional generator, an engine generator, a turbine generator, an internal combustion engine generator, a wind powered generator, a solar powered generator, a hand cranked generator, and/or the like. In some embodiments, more than one generator 102 may be included and may be connected with multiple wires 106 that connect to an outdoor box and/or the like. In some embodiments a generator 102 may comprise a 5 kW, 6.5 kW, 8 kW, 10 kW, 15 kW, 25 kW, 30 kW or a greater than 30 kW rated generator. A generator 102 may comprise a power source 111, such as a mechanical engine, and/or an output 109 adapted to couple with a wire 106. In some embodiments, the output 109 may comprise an outlet adapted to couple with the prongs and/or the like of a plug 104 at the end of a wire 106. The output 109 may be adapted to output power generated by the power source 111 to the wire 106.

The generator 102 may be located in the general proximity of the outdoor box 107 and/or the like, such that the required length of a wire 106 and/or the like may be substantially reduced and/or minimized. The generator 102 may be portable or may be permanently or semi-permanently fixed in a location in proximity to the outdoor box 107. In some embodiments, the generator 102 may be connected to the outdoor box 107 via underground wires through conduits, and/or the like. In some embodiments, a computer monitoring system may be coupled with the generator, the computer monitoring system adapted to shut off the generator in cases of emergency or automatically turn on the generator in the event the power of a dwelling, commercial building, and/or the like is shut off. The computer monitoring system may also be adapted to alert the building owner via text message, email, audible alert, visual alert, and/or the like in the event the power to the dwelling from a power company is lost and the generator is activated. In some embodiments, a generator 102 may be included in the generator coupling kit, and/or the generator coupling kit may be adapted to electrically couple with any generator consistent with the present disclosure.

Referring back to FIG. 1, the plug 104 may be adapted to plug into the generator 102 and couple with the wire 106 and/or the like. The plug 104 may comprise any electrical plug suitable for use with a generator. For example, the plug may comprise a plug of the following types: IEC 60320 C13/C14; IEC 60320 C19/C20; IEC 60309 2 Phase+Earth; IEC 60309 3 Phase+Earth; IEC 60309 3 Phase+Earth+Neutral; NEMA 5-15P; NEMA L5-15P; NEMA 5-20P; NEMA L5-20P; NEMA L5-30P; NEMA 6-15P; NEMA L6-15P;

NEMA 6-20P; NEMA L6-20P; NEMA L6-30P; NEMA L14-30P; A-TYPE; B-TYPE; C-TYPE; D-TYPE; E-TYPE; F-TYPE; G-TYPE, H-TYPE; I-TYPE; J-TYPE, K-TYPE; L-TYPE; M-TYPE; and/or the like. In some embodiments, the plug 104 may comprise an L16 or an L14-30 male plug, such as a 30 amp twist lock male plug. The plug 104 may be adapted to couple with a wire 106. In some embodiments, more than one plug 104 may be included in a generator coupling kit. The electrical panel connector 105 may be identical to the plug 104 described herein and/or may be adapted to couple with the outdoor box 107.

The wire 106 may comprise a wire suitable for use with embodiments of the present invention, and may comprise a portable cord. The wire 106 may comprise an electrical wire comprising an insulated conductor adapted to carry electricity. In some embodiments, the wire may 106 may be in compliance with one or more electrical codes. For example, the wire 106 may comprise a wire of the following types: S, SE, SEO, SEOW-A, SEW-A, SJE, SJEO, SJEO-A, SJEW-A, SJO, SJOW-A, SJTO, SJTOW-A, SJTW-A, SJT, SVT, SEOW, SJ, SJOW, SO, SOW, SOW-A, SPT-1, SPT-2, SPT-3, ST, STO, STOW-A, STW-A, SVT, T, TW, THN, THHN, THWN, and/or the like. In some embodiments, the wire 106 may comprise a 10-4 s/o 600V wire. The wire 106 may be of a length capable of connecting the generator 102 with an outdoor box 107 and/or an indoor electrical panel 110. For example, the wire 106 may comprise a length of 20' to 80'. The outdoor box 107 may be adapted to couple with the generator 102, for example, via the wire 106, and couple with an indoor electrical panel 110 via internal wiring 117 and/or the like. An exemplary outdoor box 107 is depicted in FIGS. 7A and 7B.

Figure 7A:
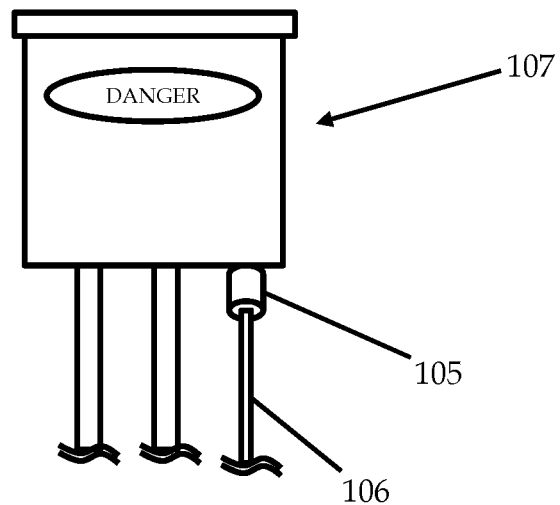
FIG. 7A depicts an exemplary outdoor box, wire, and plug in accordance with embodiments of the present invention in an un-stored configuration.
Figure 7B:
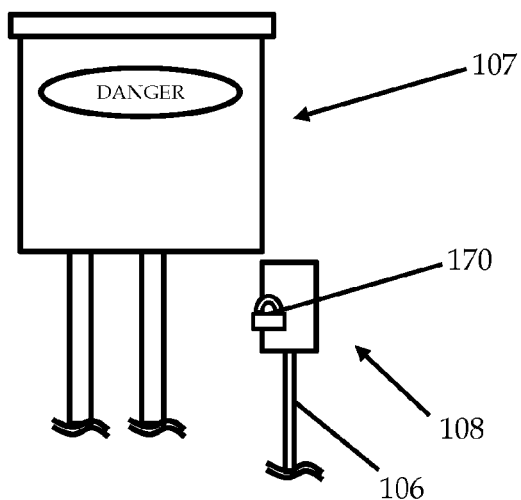
FIG. 7B depicts an exemplary outdoor box, wire, and lockout box in accordance with embodiments of the present invention in an unstored configuration.

FIGS. 7A and 7B depict an exemplary outdoor box 107, wire 106, electrical panel connector 105, lockout box 108, and plug lock 170 in accordance with embodiments of the present invention. During active use of the generating coupling kit, the wire 106 may be connected to the outdoor box 107 via the electrical panel connector 105 and/or the like. Although one outdoor box 107 is depicted, the use of more than one outdoor box 107 is contemplated within embodiments of the present disclosure. In exemplary embodiments, the outdoor box 107 may comprise a panel adapted to provide an electrical power feed received from a generator and/or the like. While both an indoor electrical panel 110 and an outdoor box 107 are depicted in the Figures, in some embodiments only one of the two may be utilized. In some embodiments, more than one outdoor box 107 and/or more than one indoor electrical panel 110 may be included. In some embodiments the outdoor box 107 may be adapted to balance and/or regulate a load of electricity. The outdoor box 107 may be adapted to couple with a generator, or the like, and/or couple with an indoor electrical panel.

In exemplary embodiments, when not in use, the electrical panel connector 105, a portion of the wire 106, a plug 104 and/or the like may be stored and locked/secured in a lockout box 108 for safety reasons. The lockout box 108 may be attached to and/or adjacent to the wall 130, may be a standalone unit detached from the wall, and may be of a size sufficient to store the electrical panel connector 105, the plug 106, a portion of the wire 106, and/or the like. For example, the lockout box 108 may be adapted to store the electrical panel connector 105 within the lockout box 108. In some embodiments, the lockout box 108 may be formed in the shape of the electrical panel connector 105 such that movement of the electrical panel connector 105 within the lockout box 108 is restricted, thereby substantially protecting the electrical panel connector 105 from damage. The lockout box 108 may be locked and secured in a locked condition with a plug log 170. The plug lock 170 and any lock described herein may comprise a mechanical key opened lock, a combination lock, a digital lock, a fingerprint-secured lock, FOB opened lock, and/or the like. The lockout box 108 may comprise an integral and/or separate plug lock 170. In some embodiments, the lockout box 108 may comprise an opening for allowing the wire 106 to pass out of the box 108 while locking the electrical panel connector 105 within the box. Although one lockout box 108 is depicted multiple boxes may be provided for locking the plug 104 and/or the electrical panel connector 105 in individual boxes. A generator coupling kit in accordance with exemplary embodiments may comprise a power meter, such as a voltage and/or amp meter, or the like.

Figure 5:
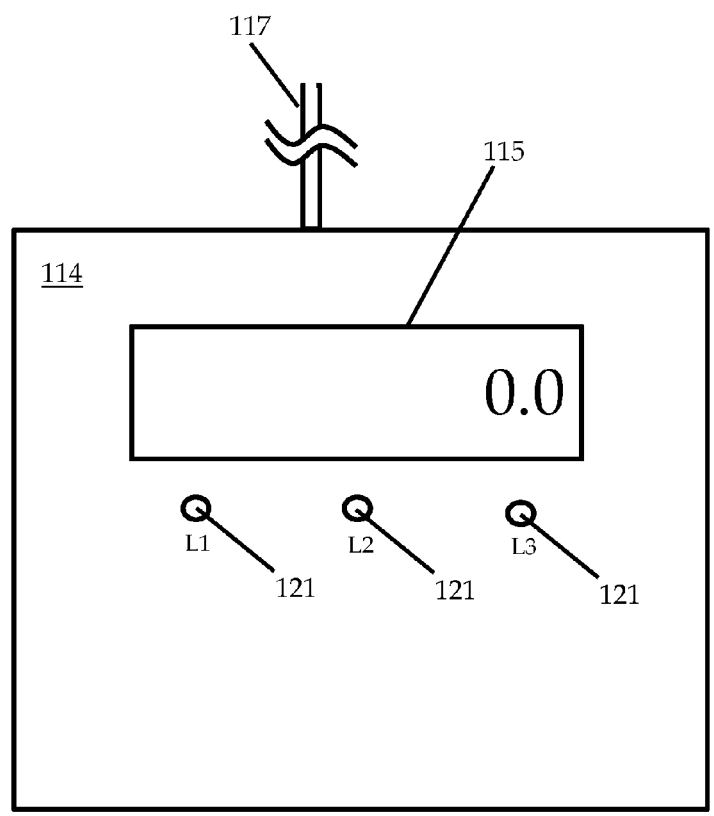
FIG. 5 depicts an exemplary voltage and/or amp meter for use with a generator coupling kit in accordance with embodiments of the present invention.

FIG. 5 depicts an exemplary voltage and/or amp meter 114 for use with a generator coupling kit in accordance with embodiments of the present invention. In exemplary embodiments, a voltage/amperage meter 114 may be coupled with an electrical panel, such as panels 107 or 110 described with respect to FIG. 1. The voltage/amperage meter 114 may be adapted to display an amount of amps/volts/watts currently in use, thereby allowing for a calculation of available amperage. The meter 114 may be adapted to couple with internal wiring 117 and/or the like. The meter 114 may comprise a display 115 adapted to display the amount of power currently in use and/or the available amperage. The display 115 may comprise a digital display or a mechanical display, such as a needle indicator. An amount of available amperage is generally dependent on the type of generator being used. In some embodiments, a 5500 watt generator may be used, which will allow use of 20 amps per phase. The voltage/amperage meter 114 may be coupled to a 15 amp s1 pole circuit breaker and/or the generator breaker 112. In some embodiments, the voltage/amperage meter 114 may comprise a 1 phase 220 AC amp meter, or the like. The voltage/amperage meter 114 may also be coupled with a 5 amp 250 volt fuse slow blow, or the like. In some embodiments, the meter 114 may comprise one or more phase indicators 121 for indicating a phase, for example, L1, L2, and L3 as active and/or to be measured.

Referring back to FIG. 1, the generator coupling kit may comprise internal wiring 117. In exemplary embodiments, internal wiring 117, may comprise one or more wires suitable for use with embodiments of the present invention, and may comprise an electrical cord adapted to directly couple with an outdoor box 107, an indoor electrical panel 110, and/or a voltage/amp meter 114, other components described herein, and/or the like. The wiring 117 may comprise an electrical wire comprising an insulated conductor adapted to carry electricity. In some embodiments, the wiring 117 may be in compliance with one or more electrical codes. For example, the wiring 117 may comprise a wire of the following types: S, SE, SEO, SEOW-A, SEW-A, SJE, SJEO, SJEO-A, SJEW-A, SJO, SJOW-A, SJTO, SJTOW-A, SJTW-A, SJT, SVT, SEOW, SJ, SJOW, SO, SOW, SOW-A, SPT-1, SPT-2, SPT-3, ST, STO, STOW-A, STW-A, SVT, T, TW, THN, THHN, THWN, and/or the like. In some embodiments, the wiring 117 may comprise a 10-4 s/o 600V wire. The wiring 117 may be of a length capable of connecting the outdoor box 107 with the indoor electrical panel 110, and/or the like. For example, the wiring 117 may comprise a length of 1' to 80'. In exemplary embodiments, the generating coupling kit may include, or may be adapted to couple with, an indoor electrical panel 110. An exemplary indoor electrical panel 110 is shown in FIG. 2.

Figure 2:
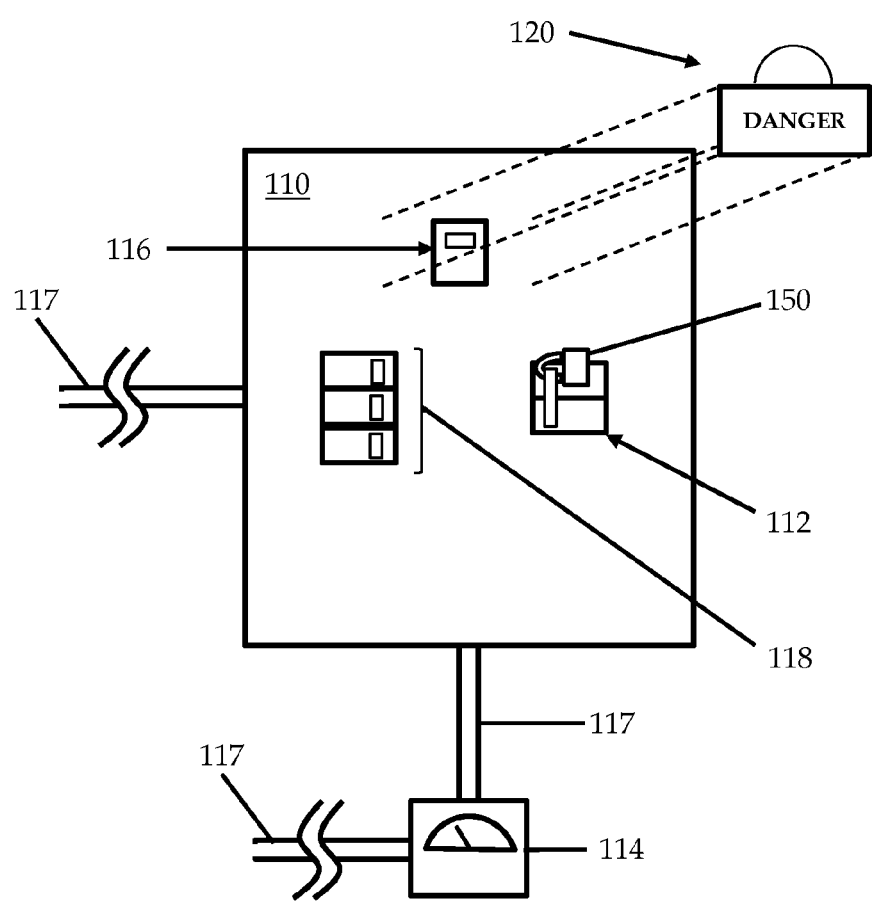
FIG. 2 depicts a block diagram of a portion of a generator coupling kit in an assembled configuration in accordance with embodiments of the present invention.

FIG. 2 depicts a block diagram of a portion of a generator coupling kit in an assembled configuration in accordance with embodiments of the present invention. In accordance with embodiments of the present invention, the portion of the kit depicted may comprise an indoor electrical panel 110, internal wiring 117, a safety member 120, a breaker lock 150, and a voltage/amperage meter 114. The indoor electrical panel 110 may comprise a generator breaker 112, a main breaker 116, and/or auxiliary breakers 118. The generator breaker 112 may be connected to an outdoor box 107 and/or a generator via the internal wiring 117 and/or the like. To install the generator coupling kit, the outdoor box 107 may be installed and/or coupled with the indoor electrical panel 110. The outdoor box 107 and/or the generator may be coupled with the indoor electrical panel 100 via a generator breaker 112. The generator breaker 112 may be adapted to switch on and off the power received from the generator. The indoor electrical panel 110 may also be coupled with a power meter 114 via internal wiring 117 and/or the like.

The indoor electrical panel 110 and/or outdoor box may comprise a component of an electricity supply system adapted to divide an electrical power feed into subsidiary circuits, while providing a protective fuse or circuit breaker for each circuit in a common enclosure. The indoor electrical panel 100 and/or outdoor box may comprise a main switch and/or residual-current devices (RCD) or residual current breakers with overcurrent protection (RCBO). The indoor electrical panel 100 and/or outdoor box 100 may comprise a distribution board, a breaker panel, a circuit breaker panel, a consumer unit (CU) an, electrical panel, a fuseboard, an electric board, a fusebox, a breaker box, a load center, a panelboard, a power breaker, a service panel, an alternating current distribution board, and/or a direct current distribution board.

The generator coupling kit may also comprise a safety member 120 and a breaker lock 150 for safety reasons. The safety member 120 may be adapted to cover one or more breakers, for example, the main breaker 116, for safety reasons. For example, the safety member 120 may be installed over the main breaker 116 to prevent the main breaker 116 from being turned on when the generator breaker 112 is turned on. In some embodiments, the indoor electrical panel 110 may be adapted to couple with a computerized system that prevents activation of the main breaker 116 when the generator breaker 112 is activated. In some embodiments, the breaker lock 150 may comprise a lock or other device adapted to prevent the generator breaker, and/or the like from being turned on and/or off when the breaker lock 150 is engaged and locked. In some embodiments, the generator coupling kit may comprise a 30 amp lockout for inside of the panel 110. Once the generator coupling kit is installed, power may be restored to certain areas of the building by turning on/activating a number of auxiliary breakers 118, the specific breakers to be activated dependent upon the areas of the building the user desires to restore power to.

Referring now to FIGS. 1 and 2, in exemplary embodiments, to install the generator coupling kit, the plug 104 may be connected to the wire 106. A hole 140 may be drilled on the outside of the building as close to the panel 110 as possible. The hole 140 may be of a size suitable for embodiments of the present invention. For example, the hole 140 may be adapted to allow the wire 106 to pass from the exterior of the building to the interior for coupling with the panel 110. The panel 110 may comprise any panel suitable for embodiments of the present invention. For example, the panel 110 may comprise a circuit breaker panel or the like. In some embodiments, the panel 110 may comprise a 30 circuit 200 amp main breaker. When the hole 140 is drilled and/or otherwise made, the wire 106 may be fed through the hole inside of the building through the wall 130.

A generator breaker 112 may be installed in the panel 110 for coupling with the wire 106. When installing the kit, to make the process of installing the generator coupling kit easier, it may be useful for the installer to mark the panel 110 with the location of the breakers and/or the like ahead of time. The generator breaker 112 may comprise any breaker suitable for embodiments of the present invention. For example, the generator breaker 112 may comprise a 30 amp 2 pole breaker. When the wire 106 is fed into the building through the hole 140, the wire 106 may be connected to the panel 110. In some embodiments, the wire 106 may comprise one or more ground wires, hot wires, and neutral wires. The ground wires may be colored green, the hot wires may be colored black, and the neutral wires may be colored white, as is standard in North America. Other coloring schemes, such as the international scheme (brown, blue, green w/yellow stripe) may be used as well. In some embodiments, the wire 106 may comprise a green wire, a white wire, and two black wires. The green wire may be connected to a ground, which may be any place metal exists on the panel 110. The white wire may be attached to a neutral bar on the panel 110. The two black wires may be attached to the generator breaker 112, which may be a 30 amp two pole breaker. In some embodiments there may be 2 circuits, one on L-1 and one on L-2. In some embodiments, there may be 3 circuits, one on L-1, one on L-2, and one on L-3.

In exemplary embodiments, the safety member 120 may comprise a sign warning the user to refrain from operating a main breaker 116. For example, the safety member 120 may be a sign having the phrase "DANGER DO NOT OPERATE" printed thereon. The safety member 120 may be adapted to cover, conceal, and/or block access to the main breaker 116 to prevent its use. In some embodiments, a breaker lock 150 may be adapted to prevent the use of the generator breaker 112 when the generator 102 is not active and coupled with the generator coupling kit. The breaker lock 150 may secure the generator breaker 112 in an off position. A number of additional breaker locks 150 may also be used. For example a breaker lock may be used on the main breaker 116 to prevent its use during operation of the generator coupling kit.

Figure 3:
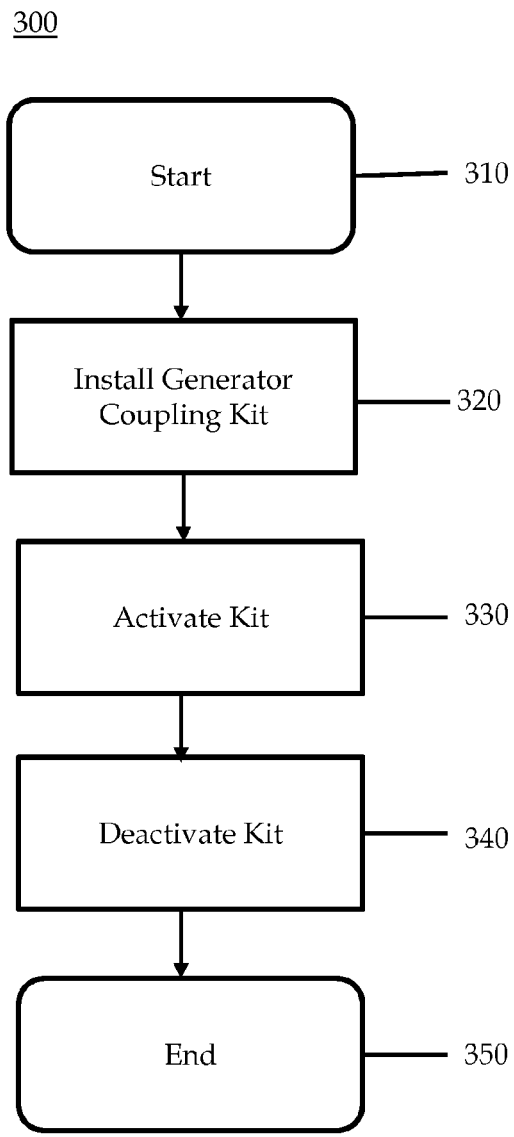
FIG. 3 depicts a flowchart of a method of using a generator coupling kit in accordance with embodiments of the present invention.

FIG. 3 depicts a flowchart of a method of using a generator coupling kit in accordance with embodiments of the present invention. In accordance with embodiments of the present invention, a generator coupling kit, such as the examples disclosed herein with respect to FIGS. 1 and 2 is provided for use at step 310, where the method may begin. In embodiments, such a generator coupling kit may generally comprise a plug, a wire, an electrical panel connector, a lockout box, a safety member, a breaker lock, and/or a voltage/amperage meter. For convenience, the method 300 of FIG. 3 is described with reference to the generator coupling kit described hereinabove with respect to FIGS. 1-2. The method 300 may be carried out using other embodiments as well.

At step 320, the generator coupling kit may be installed using any of the methods described herein with respect to FIGS. 1 and 2, and/or any method of installation consistent with the present invention. After the generator coupling kit is installed it may be placed in a stored configuration. The stored configuration may comprise, for example, the plug 104, the electrical panel connector 105, and/or a portion of the wire 106 being locked in the lockout box 108 and the breaker lock 150 locking the generator breaker 112 in an off position. When the generator coupling kit is desired to be used, the generator coupling kit may be taken out of storage. The user may activate the generator coupling kit and activate generated power to a building at step 330.

In exemplary embodiments, at step 330, the lockout box 108 may be unlocked and the plug 104 and wire 106 removed.

For safety reasons, all auxiliary breakers 118 may be turned off one by one and the main breaker 116 may be turned off last. After the main breaker 116 is turned off, the safety member 120 may be installed. By way of example, when the safety member 120 is a sign reading "Danger Do Not Operate," or the like, the sign may be placed over the main breaker 116 so that the main breaker 116 cannot be turned on without displacing the safety member 120. Installing the safety member 120 may prevent users form accidentally turning on the main breaker 116. The breaker lock 150 may then be removed from the generator breaker 112, which may be a 30 amp 2 pole breaker. The generator 102 may then be turned on.

In exemplary embodiments, after the generator 102 is turned on, the plug 104, which may be a L16 male plug, may be connected to the generator 102. The electrical panel connector 105 may be connected to the outdoor box 107 before or after turning on the generator and connecting the plug 104 to the generator 102. The user may then turn on the generator breaker 112 on the panel 110, which may control the voltage/amperage meter 114. After the generator breaker 112 is turned on, a number of auxiliary breakers 118 may be turned on, for example, one by one. The main breaker 116, however, must not be turned on for safety reasons. As each of the auxiliary breakers 118 is turned on, the voltage/amperage meter 114 may be adapted to display the amperage that is being used. The user must stay within the amperage that is allowed by the generator 102, thereby allowing the areas of the building powered by the auxiliary breakers 118 to receive an amount of power. Devices in the building may now be used and receive power from the generator 102. When the user has been informed by the electric provider, such as the electric company, that power has been restored, the power from the generator may be deactivated at step 340, and the generator coupling kit may be returned to a stored position.

In exemplary embodiments, at step 340, when the main power source has been restored, each of the auxiliary breakers 118 that had been turned on may now be turned off one by one. The generator breaker 112 may then be turned off and the breaker lock 150 may be placed on the generator breaker 112, thereby securing the generator breaker 112 in a locked position. The generator 102 may be turned off, and the wire 106 may be rolled up and secured with the plug 104, and/or the electrical panel connector 105 in the lockout box 108, and the lockout box 108 may be locked. The safety member 120 may then be removed from the position covering the main breaker 116, and the main breaker 116 may be turned on. After the main breaker 116 is turned on, the auxiliary breakers 118 may then be turned on one by one, thereby restoring the main source of power to the building. After the main source of power is restored, the method may end at step 350.

Figure 4:
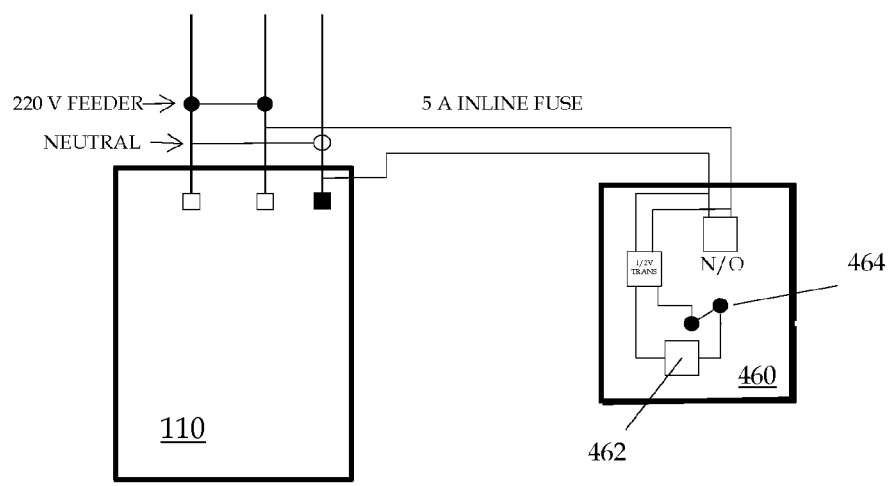
FIG. 4 depicts a block diagram of an alarm system to be adapted to a generator coupling kit in accordance with embodiments of the present invention.

FIG. 4 depicts a block diagram of an alarm system to be adapted to a generator coupling kit in accordance with embodiments of the present invention. In many embodiments, an alarm system 460 may comprise a power detection member from the main power line into a home or building, a notification member 462, and a switch 464. In many embodiments, the power detection member may comprise any line or wire fed off the main power line, which would be live when power were restored to the home or building. The alarm system 460 may be provided and connected to a panel as a separate unit or built within the panel with electronics boards.

When the main power line is live and power is restored, through a variety of components (for example, as schematically shown), the notification member 462 is triggered. The notification member may comprise any audible and/or visual notification mechanism capable of alerting the owners of the home or building that power has been restored and the generator is no longer needed. In many embodiments, the notification member 462 may comprise an audible buzzer, bell, or the like. In other embodiments, the notification member 462 may comprise a flashing light or may be linked to a light or lights within the home or building. In further embodiments, the notification member 462 may comprise a device connected to the home or building's telephone system, such that the telephone may ring and provide an audible notification. In even further embodiments, the notification member 462 may be adapted into a multimedia system, for example, into a fiber optic television line, such that a visual notification may be displayed on a television screen within the home or building. In further embodiments, the notification member 462 may be adapted to transmit an electronic alert, such as an e-mail, a text message, a social media message, and/or the like indicating that the power has been restored.

Generally, the notification means 462 will continue to operate until terminated by the owner/agent of the home or building via a switch 464. In various embodiments, the switch may include any type of mechanism to shut off the power supply to the notification means 462. In certain embodiments, the switch 464 may be wired to the generator and/or generator panel, and when the generator and/or generator panel are off or deactivated, the switch 464 may terminate the notification member 462.

Figure 8:
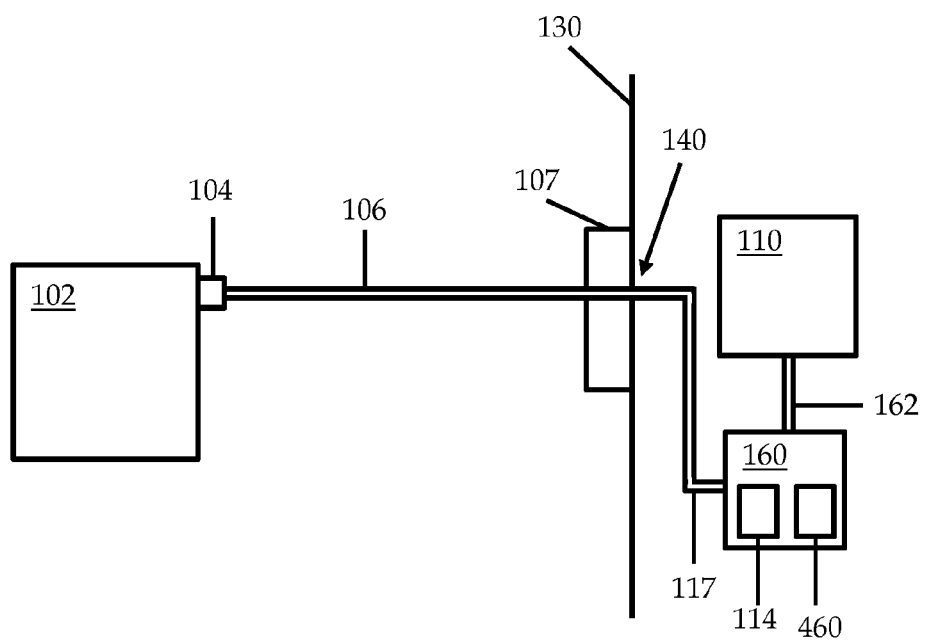
FIG. 8 depicts a block diagram of a portion of a generator coupling kit in accordance with embodiments of the present invention.

FIG. 8 depicts a block diagram of a portion of a generator coupling kit in accordance with embodiments of the present invention. The generator 102, wire 106, indoor electrical panel 110, wall 130, voltage/amp meter 114, alarm system 460, and hole 140 are generally described hereinabove with respect to FIGS. 1-7B. In exemplary embodiments, the wire 106 may comprise a plug 104 on one end for coupling with the generator 102. The wire 106 may pass directly through the outdoor box 107 and couple with a control panel 160. The control panel 160 may be adapted to house and/or couple with the voltage/amp meter 114, a relay, an alarm system 460, and/or the like. The cable 106 may couple directly with the control panel 160, for example, via internal wiring 117. The internal wiring 117 may comprise 4 wires comprising two hot wires, one neutral wire, and one ground wire, and/or the like. Although depicted as two separate components, the wire 106 and internal wiring 117 connecting the generator to the control panel 106, and/or the like may comprise a single wire. For example, the wire 106 and internal wiring 117 may comprise an SO wire, and/or the like. In some embodiments, the external box 107 may comprise a pullthrough box, a pullbox, and/or the like and may facilitate the pulling through of the wire 106 through the external box 107 and the hole 130 to the control panel 160 and/or the like. In some embodiments, the wire 106, internal wiring 117, and or the like may pass through a conduit or the like. For example, a conduit 162 and/or seal tight material may be adapted to facilitate the coupling of the wires from the control panel 160 to the indoor electrical panel 110.

In some embodiments, the kit may be adapted for use with a 30 amp system, a 60 amp system, and/or the like. In some embodiments, a kit may comprise a wire 106, a relay, a meter 114, a control panel 160, a generator breaker 112, a lock box 108, an outdoor box 107, which may simply be a pullthrough box or may be an electrical panel, a danger or "do not touch sign" for covering the main breaker, an alarm system 460, and/or the like. and/or the like. The meter 114 may be intergral with the control panel 160 or may be a standalone unit. The meter 114 may receive power from the generator and may measure the amps being utilized for each phase so that the user will know how close to a predetermined limit they are and the user can choose to selectively turn on and off devices powered by the generator and/or breakers in the indoor electrical panel to optimize the load of the phases and/or optimize the amount of electricity being pulled from the generator and/or the like. In some embodiments, the meter 114 may comprise a battery powered backup. In some embodiments, the mete It should be emphasized that the above-described embodiments of the present invention are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present invention and protected by the following claims.

What is claimed is:

1. A generator coupling kit comprising:
   a wire adapted to couple with a generator on a first end, the wire adapted to couple with an outdoor box on a second end;
   the outdoor box adapted to couple with the wire;
   an indoor electrical panel adapted to couple with the outdoor box via a generator breaker; and
   the generator breaker adapted to couple with indoor electrical panel, the generator breaker adapted to couple with the outdoor box via internal wiring, the generator breaker comprising a circuit breaker;
   wherein the generator breaker is not a transfer switch;
   wherein the generator coupling kit is adapted to couple the generator to the indoor electrical panel without the use of a transfer switch; and
   wherein the generator coupling kit is adapted to provide power to the entire indoor electrical panel.

2. The generator coupling kit of claim 1, further comprising:
   a power meter coupled with the indoor electrical panel, the power meter adapted to measure the amount of electric energy being consumed.

3. The generator coupling kit of claim 2 wherein the power meter comprises a voltage/amp meter.

4. The generator coupling kit of claim 1, further comprising:
   an alarm system coupled with the indoor electrical panel, the alarm system comprising:
      a power detection member adapted to detect the presence of power;
      a notification member adapted to notify a user if the power detection member detects the presence of power; and
      a switch adapted to selectively enable and disable the alarm system.

5. The generator coupling kit of claim 4, wherein the notification member is adapted to provide at least one of an audible alert and a visual alert to the user if the power detection member detects the presence of power.

6. The generator coupling kit of claim 1, wherein the wire comprises:
   a plug adapted to couple with the generator; and
   an electrical panel connector adapted to couple with the outdoor box.

7. The generator coupling kit of claim 6, further comprising a lockout box adapted to lock the electrical panel connecter within the box, thereby preventing access to the electrical panel connector and use of the wire while the lockout box is locked.

8. The generator coupling kit of claim 1, further comprising a safety member adapted to prevent the activation of a main circuit breaker attached to the indoor electrical panel.

9. The generator coupling kit of claim 1, further comprising a breaker lock adapted to prevent the activation of the generator breaker.

10. The generator coupling kit of claim 1, wherein the internal wiring is adapted to couple outdoor box and the indoor electrical panel through a hole in a wall.

11. A generator coupling kit comprising:
    a wire adapted to couple with a generator on a first end, the wire adapted to couple with an outdoor box on a second end;
    the outdoor box adapted to couple with the wire;
    an indoor electrical panel adapted to couple with the outdoor box via a generator breaker;
    the generator breaker adapted to couple with indoor electrical panel, the generator breaker adapted to couple with the outdoor box via internal wiring, the generator breaker comprising a circuit breaker;
    a power meter coupled with the indoor electrical panel, the power meter adapted to measure the amount of electric energy being consumed; and
    an alarm system coupled with the indoor electrical panel;
    wherein the generator breaker is not a transfer switch;
    wherein the generator coupling kit is adapted to couple the generator to the indoor electrical panel without the use of a transfer switch; and
    wherein the generator coupling kit is adapted to provide power to the entire indoor electrical panel.

12. The generator coupling kit of claim 11 wherein the power meter comprises a voltage/amp meter.

13. The generator coupling kit of claim 11 wherein the alarm system comprises:
    a power detection member adapted to detect the presence of power;
    a notification member adapted to notify a user if the power detection member detects the presence of power; and
    a switch adapted to selectively enable and disable the alarm system.

14. The generator coupling kit of claim 13, wherein the notification member is adapted to provide at least one of an audible alert and a visual alert to the user if the power detection member detects the presence of power.

15. The generator coupling kit of claim 11, wherein the wire comprises:
    a plug adapted to couple with the generator; and
    an electrical panel connector adapted to couple with the outdoor box.

16. The generator coupling kit of claim 15, further comprising a lockout box adapted to lock the electrical panel connecter within the box, thereby preventing access to the electrical panel connector and use of the wire while the lockout box is locked.

17. The generator coupling kit of claim 11, further comprising a safety member adapted to prevent the activation of a main circuit breaker attached to the indoor electrical panel.

18. The generator coupling kit of claim 11, further comprising a breaker lock adapted to prevent the activation of the generator breaker.

19. A method for using a generator coupling kit, the method comprising:
    providing a generator coupling kit comprising:
       a wire adapted to couple with a generator on a first end, the wire adapted to couple with an outdoor box on a second end;
       the outdoor box adapted to couple with the wire;

an indoor electrical panel coupled with the outdoor box, the indoor electrical panel comprising a main breaker, a plurality of auxiliary breakers, and a generator breaker;

an alarm system coupled with the indoor electrical panel;

a lockout box locking a portion of the wire within the box;

a safety member adapted to prevent the activation of the main breaker attached to the indoor electrical panel; and a breaker lock preventing the activation of the generator breaker when in a locked position;

unlocking the lockout box and removing the portion of the wire within the box;

turning off all auxiliary breakers and the main breaker;

covering the main breaker with the safety member;

unlocking the breaker lock, thereby allowing activation of the generator breaker;

turning on the generator;

connecting the wire to the generator and the outdoor box; and turning on the generator breaker and at least one of the plurality of auxiliary breakers;

wherein the generator breaker is not a transfer switch;

wherein the generator coupling kit is adapted to couple the generator to the indoor electrical panel without the use of a transfer switch; and wherein the generator coupling kit is adapted to provide power to the entire indoor electrical panel.

20. The method of claim 19, further comprising:

receiving an indication from the alarm system that the power has been restored;

turning off the at least one of the plurality of auxiliary breakers and the generator breaker;

locking the breaker lock;

turning off the generator;

removing the wire from the generator and the outdoor box;

locking a portion of the wire in the lockout box;

removing the safety member;

turning on the main breaker; and turning on the least one of the auxiliary breakers.

\* \* \* \* \*